United States Patent
Valerio

(10) Patent No.: US 8,138,437 B2
(45) Date of Patent: Mar. 20, 2012

(54) METHOD AND SYSTEM FOR RECOVERING METAL FROM PROCESSED RECYCLED MATERIALS

(75) Inventor: Thomas A. Valerio, Atlanta, GA (US)

(73) Assignee: Thomas A. Valerio, Atlanta, GA (US)

( * ) Notice: Subject to any disclaimer, the term of this patent is extended or adjusted under 35 U.S.C. 154(b) by 14 days.

(21) Appl. No.: 12/870,223

(22) Filed: Aug. 27, 2010

(65) Prior Publication Data

US 2011/0049021 A1    Mar. 3, 2011

Related U.S. Application Data

(63) Continuation of application No. 12/482,587, filed on Jun. 11, 2009, now Pat. No. 7,786,401.

(60) Provisional application No. 61/060,515, filed on Jun. 11, 2008.

(51) Int. Cl.
*B07C 5/344* (2006.01)

(52) U.S. Cl. .... 209/571; 209/552; 209/930; 324/207.16

(58) Field of Classification Search ............. 209/44.2, 209/552, 571, 930; 324/207.11, 207.13, 324/207.15, 207.16, 207.22, 207.24, 207.26
See application file for complete search history.

(56) References Cited

U.S. PATENT DOCUMENTS

| | | | |
|---|---|---|---|
| 2,587,686 A | 3/1952 | Robert | |
| 3,448,778 A | 6/1969 | Ramsay | |
| 3,568,839 A | 3/1971 | Dunlea | |
| 3,588,686 A | 6/1971 | Lingmann et al. | |
| 3,670,969 A | 6/1972 | Terada | |
| 3,701,419 A | 10/1972 | Hutter et al. | |
| 3,702,133 A | 11/1972 | Vibert et al. | |
| 3,905,556 A | 9/1975 | Drage | |
| 4,317,521 A | 3/1982 | Clark | |
| 4,362,276 A | 12/1982 | Morey | |
| 4,387,019 A | 6/1983 | Dale | |
| 4,405,451 A | 9/1983 | Roman | |
| 4,541,530 A | 9/1985 | Kenny et al. | |
| 4,557,386 A | 12/1985 | Buckley et al. | |
| 4,563,644 A | 1/1986 | Lenander et al. | |
| 4,576,286 A | 3/1986 | Buckley et al. | |
| 4,597,487 A | 7/1986 | Crosby | |
| 4,718,559 A | 1/1988 | Kenny et al. | |
| 4,724,384 A | 2/1988 | Castovilly et al. | |
| 4,848,590 A | 7/1989 | Kelly | |

(Continued)

FOREIGN PATENT DOCUMENTS

DE    4306781    9/1994

(Continued)

OTHER PUBLICATIONS

Hottenstein. Beyond Density. Recycling Today [online]. Nov. 18, 2008, http://www.recyclingtoday.com/Article.aspx?article_id=21468.

(Continued)

*Primary Examiner* — Joseph C Rodriguez
(74) *Attorney, Agent, or Firm* — King & Spalding

(57) ABSTRACT

Recovering metallic materials, such as copper, from waste materials. The dynamic sensor measures the rate of change of current generated by metallic materials in the waste materials. Preprocessing and post processing of the waste materials may be completed to further concentrate the amount the metallic materials recovered from the waste.

1 Claim, 4 Drawing Sheets

U.S. PATENT DOCUMENTS

| | | | |
|---|---|---|---|
| 4,933,075 | A | 6/1990 | Nordin |
| 4,940,187 | A | 7/1990 | Lee |
| 4,986,410 | A | 1/1991 | Shield |
| 5,000,390 | A | 3/1991 | Marrs |
| 5,022,985 | A | 6/1991 | Nugent |
| 5,025,929 | A | 6/1991 | Careera |
| 5,139,150 | A | 8/1992 | Fuller |
| 5,148,993 | A | 9/1992 | Kashiwagi |
| 5,169,073 | A | 12/1992 | Marabini |
| 5,209,355 | A | 5/1993 | Mindermann |
| 5,260,576 | A | 11/1993 | Sommer |
| 5,273,166 | A | 12/1993 | Sawamura |
| 5,314,071 | A | 5/1994 | Christian |
| 5,314,072 | A | 5/1994 | Frankel |
| 5,335,791 | A | 8/1994 | Eason |
| 5,344,025 | A | 9/1994 | Tyler et al. |
| 5,344,026 | A | 9/1994 | Booth et al. |
| 5,361,909 | A | 11/1994 | Gemmer |
| 5,413,222 | A | 5/1995 | Holder |
| 5,433,157 | A | 7/1995 | Dittmann et al. |
| 5,443,157 | A | 8/1995 | Baker et al. |
| 5,465,847 | A | 11/1995 | Gilmore |
| 5,468,291 | A | 11/1995 | Waterson et al. |
| 5,502,559 | A | 3/1996 | Powell et al. |
| 5,512,758 | A | 4/1996 | Kobayashi et al. |
| 5,535,891 | A | 7/1996 | Kuniyone |
| 5,548,214 | A | 8/1996 | Yasohama |
| 5,555,324 | A | 9/1996 | Waxman et al. |
| 5,555,984 | A | 9/1996 | Sommer |
| 5,562,743 | A | 10/1996 | Daugherty |
| 5,611,493 | A | 3/1997 | Hayashi et al. |
| 5,624,525 | A | 4/1997 | Ehara |
| 5,628,409 | A | 5/1997 | Thomas |
| 5,632,381 | A | 5/1997 | Thust et al. |
| 5,667,151 | A | 9/1997 | Miura et al. |
| 5,678,775 | A | 10/1997 | Chapman |
| 5,739,524 | A | 4/1998 | Fally |
| 5,791,489 | A | 8/1998 | Leifeld |
| 5,801,530 | A | 9/1998 | Crosby |
| 5,829,600 | A | 11/1998 | Jordan et al. |
| 5,829,694 | A | 11/1998 | Chapman |
| RE36,537 | E * | 2/2000 | Sommer et al. ............... 209/576 |
| 6,100,488 | A | 8/2000 | Satake et al. |
| 6,112,903 | A | 9/2000 | Kimmel |
| 6,124,560 | A | 9/2000 | Roos |
| 6,144,004 | A | 11/2000 | Doak |
| 6,191,580 | B1 | 2/2001 | Guichard |
| 6,199,779 | B1 | 3/2001 | Mosher |
| 6,313,422 | B1 | 11/2001 | Anibas |
| 6,319,389 | B1 | 11/2001 | Fountain et al. |
| 6,420,866 | B1 | 7/2002 | Goldberg et al. |
| 6,452,396 | B2 | 9/2002 | Ott |
| 6,497,324 | B1 | 12/2002 | Doak |
| 6,568,612 | B1 | 5/2003 | Aoki |
| 6,669,839 | B2 | 12/2003 | Tipton et al. |
| 6,696,655 | B2 | 2/2004 | Harbeck et al. |
| 6,838,886 | B2 | 1/2005 | Hilliard |
| 6,914,678 | B1 | 7/2005 | Ulrichsen et al. |
| 6,984,767 | B2 | 1/2006 | Hunt |
| 7,173,411 | B1 | 2/2007 | Pond |
| 7,296,340 | B2 | 11/2007 | Sakaida et al. |
| 7,351,376 | B1 | 4/2008 | Quake et al. |
| 7,351,929 | B2 | 4/2008 | Afsari et al. |
| 7,354,733 | B2 | 4/2008 | Bukshpan et al. |
| 7,449,655 | B2 | 11/2008 | Cowling |
| 7,674,994 | B1 * | 3/2010 | Valerio ............... 209/571 |
| 7,732,726 | B2 * | 6/2010 | Valerio ............... 209/571 |
| 7,786,401 | B2 * | 8/2010 | Valerio ............... 209/571 |
| 2001/0045378 | A1 | 11/2001 | Charles et al. |
| 2002/0074274 | A1 | 6/2002 | Pegga |
| 2003/0052684 | A1 | 3/2003 | Nelson et al. |
| 2004/0144693 | A1 | 7/2004 | Tse |
| 2005/0242006 | A1 | 11/2005 | Bohlig |
| 2006/0037889 | A1 | 2/2006 | Fitch |
| 2006/0082373 | A1 * | 4/2006 | Kelley ............... 324/329 |
| 2006/0219276 | A1 | 10/2006 | Bohnert |
| 2007/0045158 | A1 | 3/2007 | Johnson |
| 2007/0084757 | A1 | 4/2007 | Jeon et al. |
| 2007/0098625 | A1 | 5/2007 | Adams |
| 2007/0187299 | A1 | 8/2007 | Valerio |
| 2007/0187305 | A1 | 8/2007 | Valerio |
| 2007/0262000 | A1 | 11/2007 | Valerio |
| 2008/0224704 | A1 * | 9/2008 | Westersten ............... 324/326 |
| 2008/0257794 | A1 | 10/2008 | Valerio |
| 2008/0303517 | A1 * | 12/2008 | Skultety-Betz et al. ...... 324/234 |
| 2009/0067579 | A1 | 3/2009 | Mori et al. |
| 2009/0140728 | A1 * | 6/2009 | Rollins et al. ............ 324/207.16 |
| 2009/0250384 | A1 | 10/2009 | Valerio |
| 2010/0005926 | A1 | 1/2010 | Valerio |

FOREIGN PATENT DOCUMENTS

| | | |
|---|---|---|
| EP | 0332564 | 9/1989 |
| EP | 0541403 | 5/1993 |
| SU | 1039567 | 9/1983 |
| SU | 1606208 | 11/1990 |
| WO | WO 2006/131377 | 12/2006 |
| WO | WO 2004/0657570 | 5/2009 |

OTHER PUBLICATIONS

Goosey et al. A Scoping Study: End-of-Life Printed Circuit Boards [online]. 2002, http://cfsd.org.uk/seeba/TD/reports/PCB_Study.pdf.

* cited by examiner

300

METHOD AND SYSTEM FOR RECOVERING METAL FROM PROCESSED RECYCLED MATERIALS

STATEMENT OF RELATED PATENT APPLICATIONS

This non-provisional patent application is a continuation of U.S. patent application Ser. No. 12/482,587, filed Jun. 11, 2009 entitled Method and System for Recovering Metal from Processed Recycled Materials, which issued as U.S. Pat. No. 7,786,401, which claims priority under 35 U.S.C. §119 to U.S. Provisional Patent Application No. 61/060,515, titled Method and System for Recovering Metal from Processed Recycled Materials, filed Jun. 11, 2008. The complete disclosures of the above-identified priority applications are hereby fully incorporated herein by reference.

FIELD OF THE INVENTION

This invention relates to systems and methods for recovering metals from recycled materials. More particularly, this invention relates to systems and methods for employing dry processes for further recovering metals, typically after employing a dynamic sensor to process materials.

BACKGROUND OF THE INVENTION

Recycling of waste materials is highly desirable from many viewpoints, not the least of which are financial and ecological. Properly sorted recyclable materials can often be sold for significant revenue. Many of the more valuable recyclable materials do not biodegrade within a short period, and so their recycling significantly reduces the strain on local landfills and ultimately the environment.

Typically, waste streams are composed of a variety of types of waste materials. One such waste stream is generated from the recovery and recycling of automobiles or other large machinery and appliances. For examples, at the end of its useful life, an automobile is shredded. This shredded material is processed to recover ferrous and non-ferrous metals. The remaining materials, referred to as automobile shredder residue (ASR), which may still include ferrous and non-ferrous metals, including copper wire and other recyclable materials, is typically disposed of in a landfill. Recently, efforts have been made to further recover materials, such as non-ferrous metals including copper from copper wiring and plastics. Similar efforts have been made to recover materials from whitegood shredder residue (WSR), which are the waste materials left over after recovering ferrous metals from shredded machinery or large appliances. Other waste streams that have recoverable materials may include electronic components (also known as "e-waste" or "waste electrical and electronic equipment (WEEE)), building components, retrieved landfill material, or other industrial waste streams. These recoverable materials are generally of value only when they have been separated into like-type materials. However, in many instances, no cost-effective methods are available to effectively sort waste materials that contain diverse materials. This deficiency has been particularly true for non-ferrous materials, and particularly for non-metallic materials, such as non-ferrous metals, including copper wiring. For example, one approach to recycling wiring has been to station a number of laborers along a sorting line, each of whom manually sorts through shredded waste and manually selects the desired recyclables from the sorting line. This approach is not sustainable in most economies since the labor component is too high.

While some aspects of ferrous and non-ferrous recycling has been automated for some time, mainly through the use of magnets, eddy current separators, induction sensors and density separators, these techniques are ineffective for sorting some non-ferrous metals, such as copper wire. Again, labor-intensive manual processing has been employed to recover wiring and other non-ferrous metal materials. Because of the cost of labor, many of these manual processes are conducted in other countries and transporting the materials adds to the cost.

Many processes for identifying and separating materials are know in the art. However, not all processes are efficient for recovering non-ferrous metals and the sequencing of these processes is one factor in developing a cost-effective recovery process. Also, many processes are "wet," that is, they involve using water or other liquid media. Wet processes tend to be less cost effective, in part, because of the extra processing required to manage and dry materials.

In view of the foregoing, a need exists for cost-effective, efficient methods and systems for recovering materials from a waste stream, such as materials seen in a recycling process, including non-ferrous metals, in a manner that facilitates revenue recovery while also reducing landfill and, preferably using a dry process.

SUMMARY OF THE INVENTION

The present invention provides cost-effective, efficient methods and systems for recovering materials from a waste stream, such as materials seen in a recycling process, including non-ferrous metals, in a manner that facilitates revenue recovery while also reducing landfill and, using a dry process, in conjunction with a dynamic sensor.

One aspect of the present invention is a system for recovering metal material from a waste material stream that includes a) processing the waste material stream using a dynamic sensor system, where the dynamic sensor system measures the rate of change of a current generated as a result of a metallic object moving past the dynamic sensor and generates an indication that the dynamic sensor senses the metallic objects in the waste material stream based on the measured rate of change of the current; b) separating, in response to the indication that the dynamic sensor senses the metallic objects in the waste material stream, a metallic fraction of the waste material stream, the metallic fraction including the metallic objects identified by the dynamic sensor; and c) processing the metallic fraction of the waste stream with an air separator to concentrate the metal content of the metallic fraction of the waste stream in a heavy fraction.

DETAILED DESCRIPTION OF THE EXEMPLARY EMBODIMENTS

Exemplary embodiments of the present invention provide systems and methods for recovering non-ferrous metals, such as copper, employing a dry process.

Figure 1:
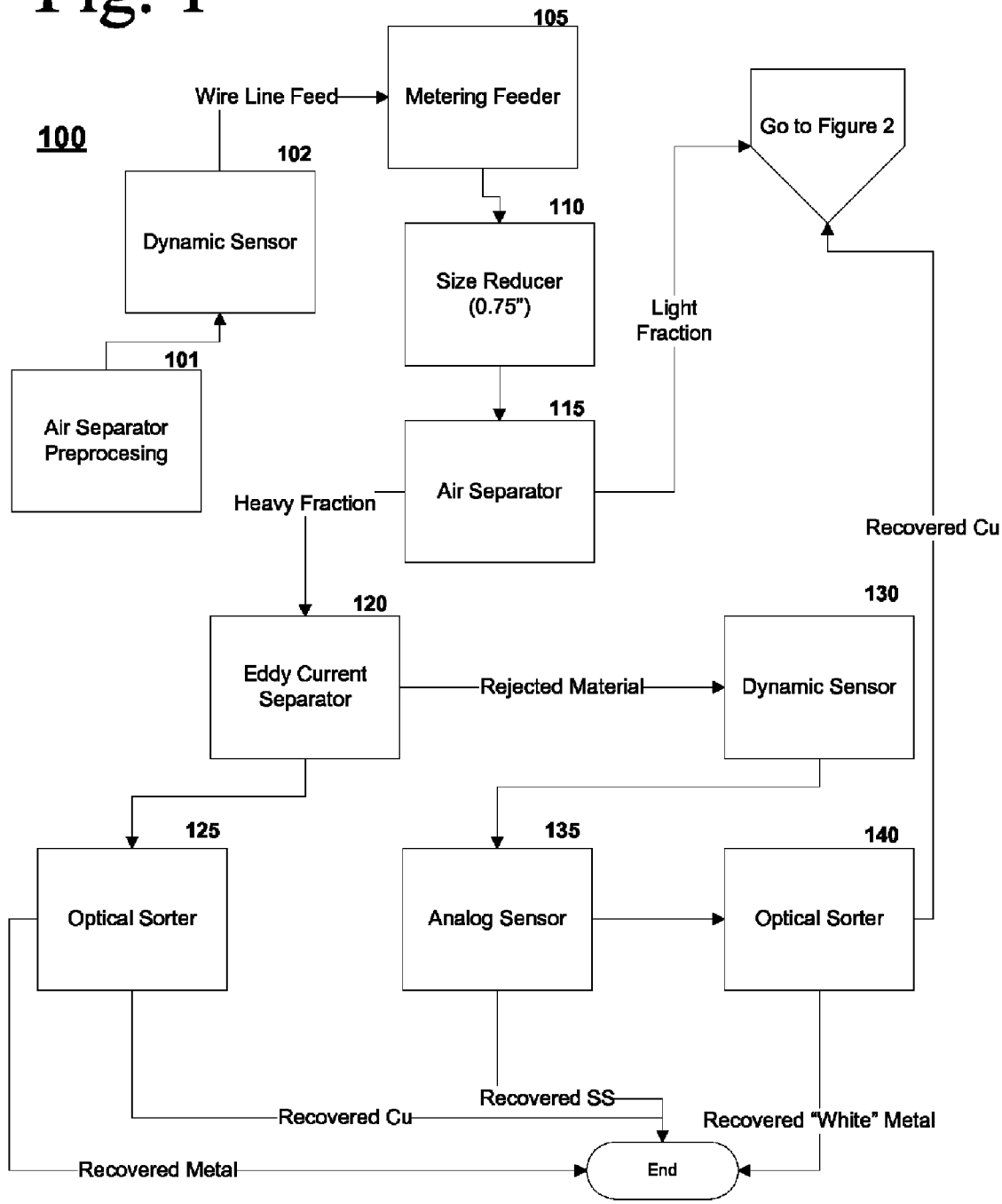
FIG. 1 depicts a process flow diagram for recovering non-ferrous metals from a heavy process fraction in accordance with an exemplary embodiment of the present invention.

FIG. 1 depicts a process flow diagram 100 for recovering non-ferrous metals from a heavy process fraction in accordance with an exemplary embodiment of the present invention. Referring to FIG. 1, at step 105, concentrate from a dynamic sensor concentrating system 102 is added to a metering feeder. Material processed by the dynamic sensor may be preprocessed with an air separator 101. A dynamic sensor differs from an inductive sensor. The dynamic sensor measures the rate of change of the amount of current produced in an inductive loop and detects the presence of metallic objects based on this rate of change. A key difference between a dynamic sensor and a standard inductive sensor is the way the detector filters and interprets the analog current level generated in the inductive loop.

In a standard inductive sensor, the analog current from the inductive loop is filtered using two criteria: the amplitude (or magnitude) of the current and the time constant of the current. In other words, for an inductive sensor to indicate that a metallic object is present, the current generated in the inductive loop must reach a specified minimum level (threshold) and remain above that threshold for a specified time interval, called the debounce, before the digital output from the sensor is turned on. This digital output is an indication of the presence of a metallic object in the monitored material. The digital output is then held on until the inductive loop current drops back below the threshold.

In contrast, the dynamic sensor takes the same analog current generated in the inductive loop and processes it based on the rate of change of the analog current over time, rather than the magnitude of the current. The rate of change of the current is determined as rise in current per unit time. When the dynamic sensor senses a change in the analog current of a minimum amount (differential) over a certain amount of time (rise time), it turns on its digital output for a specified interval (pulse time). In other words, the dynamic sensor indicates the presence of a metallic object in the material stream being measured when the rate of change of the current in the inductive loop exceeds a threshold, rather then when the magnitude of the current reaches and remains above a threshold.

As a result of this detection method, the faster a metallic object moves through the sensing field of a dynamic sensor, the faster the rise time for a current in the inductive loop and the higher the probability of the dynamic sensor detecting the presence of that metallic object. The maximum speed of objects moving through the field is limited only by the oscillation frequency of the inductive loop field and the minimum digital output pulse time.

For example, as a target metallic object approaches a dynamic sensor, the analog current in the inductive loop rises rapidly. The dynamic sensor monitors the rate of change of the analog current, and pulses the digital output as soon as the minimum differential current change occurs within the specified rise time. Thus, the sensor's digital output only turns on for a brief pulse as the leading edge of the object passes through the inductive field. The digital output remains off until another object of sufficient mass and velocity passes. This digital pulse is an indication of the presence of a metallic object in the material being monitored.

A benefit of the dynamic sensor is that it operates more effectively the faster material moves past the sensor, as compared to a standard inductive sensor. The slower belt speed required for an inductive sensor system is necessitated by the limitations of an inductive sensor. The increased belt speed for a dynamic sensor allows for a more even distribution of the materials as they are first introduced to the belt and for a greater volume of materials to be processed per unit time by a dynamic sensor system, as compared to a system employing inductive sensors.

In other embodiments, the feed material may not be produced using a dynamic sensor but instead may use other processes to concentrate the recoverable materials, such as copper wire. Typically, the feed material would have a maximum moisture content of 15 percent (15%). In certain embodiments, the feed material may have a minimum copper wire concentration of thirty-five percent (35%).

At step 110, the material is introduced into a size reducer, such as a ring mill and or pre-chopper and preferably reduced to about 0.75" or 18 mm. Material is metered onto a transfer conveyor which is fed by a vibrating feeder and carried directly into an air separator, also referred to herein as an aspiration system, at step 115. For example, a "Z-box" is one such aspiration system that could be used. The Z-box is so named because of its shape. Dry material is added at the top of the Z-box and falls by gravity. Air is forced up through the falling material. Lighter material would be entrained in the air while heavy material would fall out. The "Z" shape forces the falling material to impact walls of the chamber, thus releasing lighter materials that may be combined with heavier materials.

The light fraction generated at step 115 is further processed, as described below in connection with FIG. 2. At step 120, the heavy fraction, consisting of heavy metals, mainly stainless steel, lead, heavy pieces of copper and other non ferrous metals, is further processed in an eddy current system. An eddy current separator includes a rotor comprised of magnet blocks, either standard ferrite ceramic or the more powerful rare earth magnets, are spun at high revolutions, typically between 1800 rpm and 4000 rpm, to produce an "eddy current." This eddy current reacts with different metals, according to their specific mass and resistivity, creating a repelling force on the charged particle. The eddy current system at step 120 may also include a magnetic belt, which removes ferrous materials prior to introducing the materials into the eddy current separator.

The resulting metal stream is a high concentrate mixed non-ferrous metal product. This product is approximately fifty percent (50%) bare copper, which may have been insulated but during step 110 it was stripped and therefore entrained with the heavy fraction in the air separator. This copper is mainly gauges of ⅛" plus, but could also be smaller. At step 125, an optical sorter is used to recover the copper. Step 125 is optional and market conditions will impact the decision to perform this step.

At step 130, the reject material from the eddy current system is sent to a dynamic sensor separator where any insulated wire and other metals that were missed by the eddy current system at step 120 are detected. The dynamic sensor recovers close to 100 percent of the remaining metals. At step 135, this dynamic sensor concentrate is then passed by an analog inductive sensor. This sensor is set to remove stainless steel only. At step 140, an optical sorter detecting white colored metals can is deployed to remove these metals. A final friction conveyor can be added at this point to remove any heavy metals. The remaining material is now mainly insulated wire and fine wire particles, which is combined with the "light" fraction produced at step 115.

Figure 2:
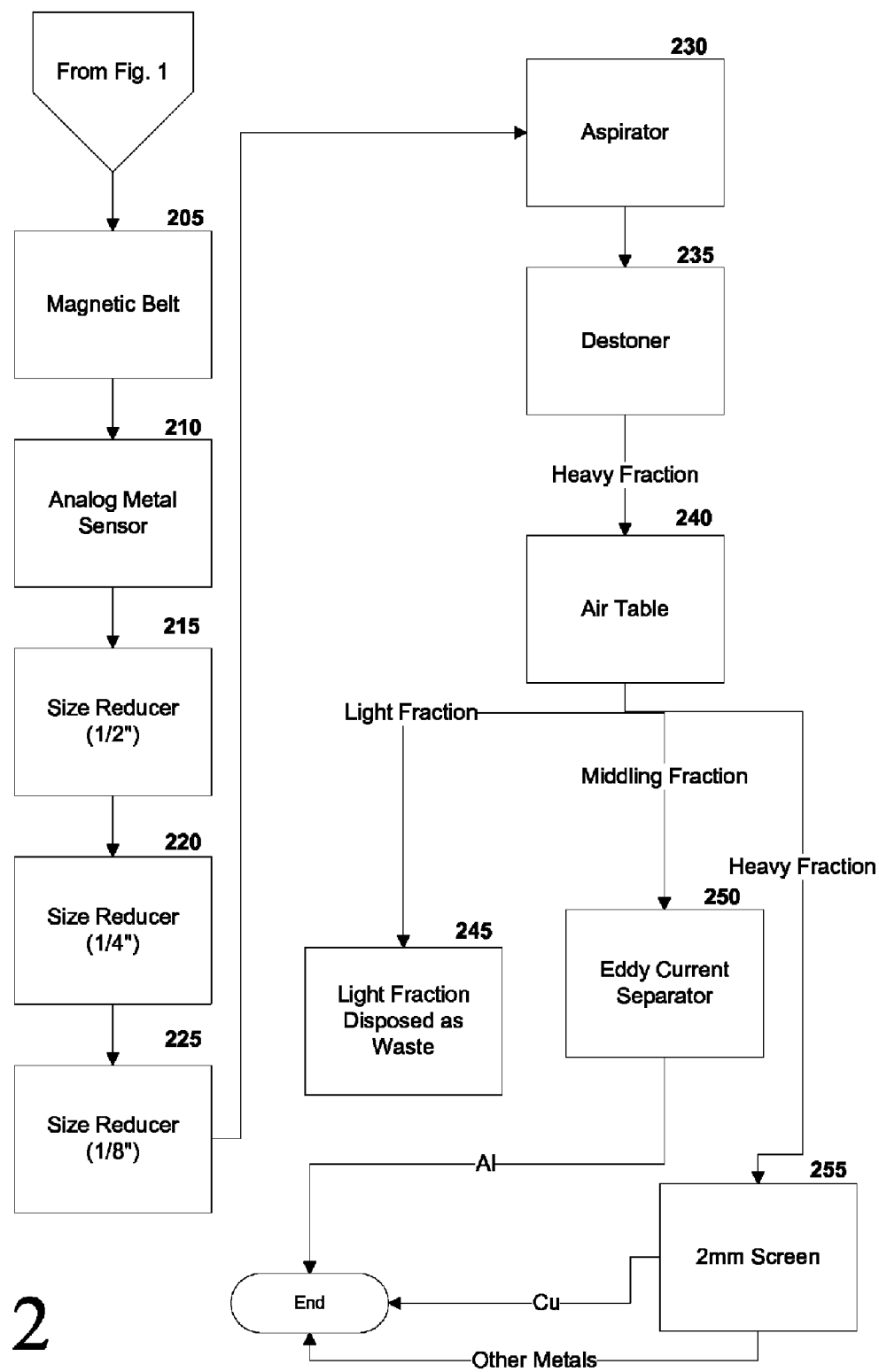
FIG. 2 depicts a process flow diagram for recovering non-ferrous metals from a light process fraction in accordance with an exemplary embodiment of the present invention.

FIG. 2 depicts a process flow diagram for recovering non-ferrous metals from a light process fraction in accordance with an exemplary embodiment of the present invention. Referring to FIGS. 1 and 2, material from steps 115 and 140 are introduced to a magnetic belt or other magnetic system at step 205, to separate ferrous materials from the waste material. At step 210, the waste material is further processed by a standard inductive sensor to remove additional metals, other than copper and possibly, aluminum.

At steps 215, 220, and 225, the material is size reduced to certain lengths, typically one-half inch, one-quarter inch, and one-eighth inch respectively. For example, a second ring mill or grinder may be used to reduce the material to one-half inch, while grinders may be used to further reduce the material to one-quarter inch, then one-eighth inch. Alternatively, a screening may be performed after the one-quarter inch grinding and material less then one-quarter inch in size may not be further ground but instead may move to step 230.

At step 230, the material is introduced into an air aspirator or separator. Alternatively, aspiration can take place either at the grinder during the grinding or in between the grinding process or after all material has been reduced to one-eighth inch. This aspiration step removes fluff, paper, and light particles and contains only trace amounts of metal.

At step 235, the remaining material is fed onto a destoner, such as a pressure or vacuum destoner. A destoner uses air, vibration, and gravity to separate light particles from heavy particles. The destoner will introduce material onto an inclined bed. Air is blown up through the bed and the bed vibrates. These three forces cause the material to separate into a light and heavy fraction. The steady air flow holds the lighter material in stratified flotation as it flows down the inclined vibrating deck. The heavier material travels up the inclined vibrating deck and out.

The light fraction generated by the destoner consists mainly of non metallic material with only trace amounts of metals. These tailings could be re-run through the destoner if there are enough metal to justify it.

At step 240, the heavy fraction is introduced to a dry air table. The dry air table is a type of vibratory screen that includes a deck covered with riffles (raised bars running perpendicular to the feed side of the table), mounted in a near flat position, on a supporting frame that allows the table to slide along the long axis of the table. The dry air table is similar in operation to a water separation table, but instead of water as the medium, air is used and is continuously injected through the porous bed of the table. A mechanism is attached to the table, and it moves the table along the long axis a distance adjustable between 0.5 inches and 1 inch and then back to the starting position typically between 200 and 300 times per minute. This reciprocal movement is preferably faster on the reverse stroke than it is on the forward stroke. This shaking movement helps transport the concentrates or heavy material to the concentrate end of the table. Normally, the feed side of the table is lower, and the concentrate end is higher on the air table, which creates an upward slope where the heavy material will ascend, while the light density material will not, and consequently, flow over the riffles.

The exemplary dry air table generates three material streams (although more streams may be generated). The light stream, which as a specific gravity of less than approximately 1.8, contain no metal. This material is disposed of as waste at step 245. Alternatively, this material could be sold as a fuel or further separated to recover materials.

The middlings stream contains aluminum, rocks, glass, heavy plastics, polyvinyl chloride insulation, and possibly trace amounts of fine wire. At step 250, this material is then introduced to a high frequency eddy current separator to recover the metallic material, mainly an aluminum product.

The heavy stream contains copper wire and trace amounts of precious metals. At step 255, this fraction is metered to a screen that would typically have 2 mm rectangular holes, although specific waste streams may dictate other screen sizes. The copper wire goes through the holes generating a pure grade of copper. This copper may be sold directly to copper or brass smelter. The material that stays on the top of the screen, which is 2 mm plus in size, is mainly stainless steel, brass, electrical connectors that have trace amounts of precious metals attached and a small percentage of copper wire. This product may be sold as its own material and could have a very high value depending on the amount of precious metals and market conditions at any given time.

Figure 3:
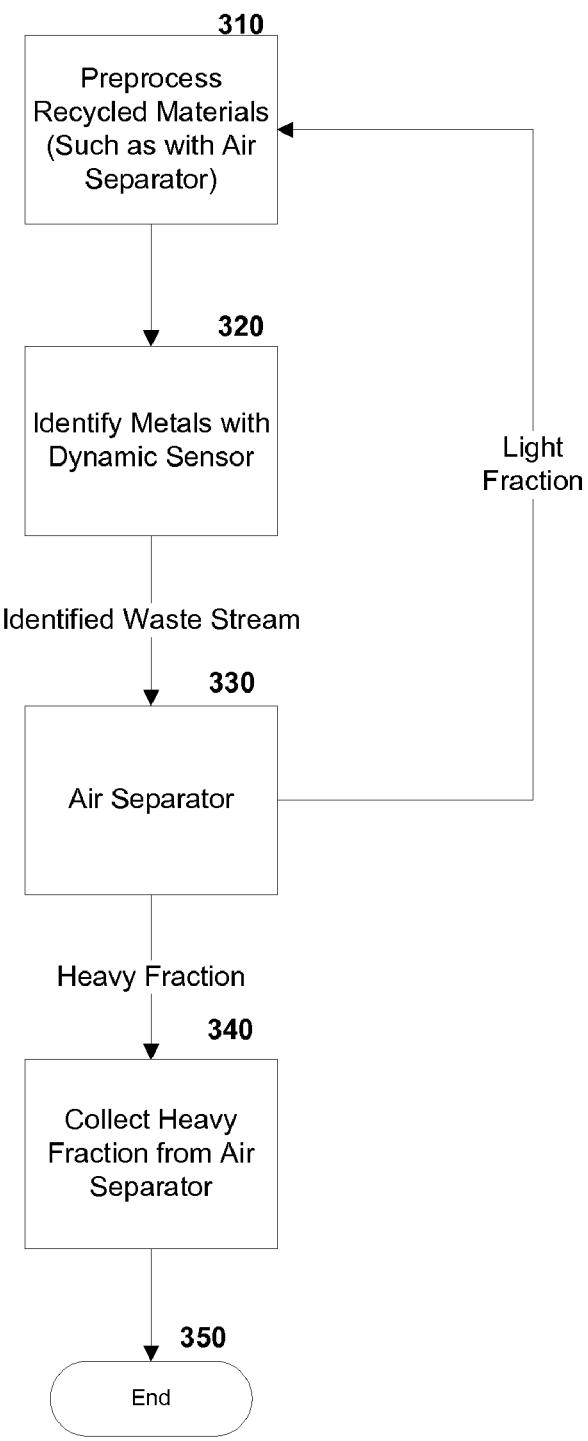
FIG. 3 depicts a process flow diagram for recovering non-ferrous metals in accordance with an exemplary embodiment of the present invention.

FIG. 3 depicts a process flow 300 for recovering non-ferrous metals from recycled material in accordance with an exemplary embodiment of the present invention. Referring to FIG. 3, at step 310, recycled materials, such as ASR or WSR materials are preprocessed before they are processed by dynamic sensors to increase the efficiencies of the dynamic sensors and recover a mixed material that is at least 85% copper wire.

For example, the materials may be preprocessed using an air separation process. In this process, materials are introduced into the air separation system, typically from the top, and drop by gravity through the system. Air is forced upward through the air separation system. Light materials, often called "fluff," which includes dirt, sand, fabrics, carpet, paper, and films, are entrained in the air and are removed out of one part of the system. Materials not entrained in the air are removed out another part of the system. Air separation systems may include multiple stages, or cascades, where material that falls through one stage is introduced into a second stage, and so on. The heavier material would be the material further processed at step 320 (discussed below).

In another preprocess step, the residue may be sorted with a mechanical screen or other type of size screening to remove large objects. The objects that pass through the screen would include the copper wiring or other recoverable metal, which is the principal target of this overall process.

In another preprocess step, the material may be subjected to a "roll back," or friction, belt separator. In this process, materials move along a belt, with the belt at a slight upward incline. Light, predominantly round, materials, such as foam, are less likely to move along with the belt and they roll back down the belt and are captured. Typically, this material will be disposed of.

Another preprocess step may subject the residue to a ferrous separation process. Common ferrous separation processes include a belt or plate magnet separator, a pulley magnet, or a drum magnet. The ferrous separation process removes ferrous materials that were not captured in the initial processing of the shredder material. This process will also capture some fabric and carpet materials. These materials either include metal threads or trap metal fines generated during the initial processing of the waste stream where the waste, such as automobiles and or large equipment or consumer goods, was shredded and ferrous metals recovered. These trapped ferrous metal fines allow the ferrous separation process to remove these materials.

Of course, any preprocessing of materials at step 310 could include one, two, three, or all four of these processes.

At step 320, the material is processed by a dynamic sensor. As described above, a dynamic sensor differs from a standard inductive sensor in that the sensor measures the rate of change of the amount of current produced in an inductive loop and detects the presence of metallic objects based on this rate of change. Also, other processing steps that remove undesirable materials could be employed in conjunction with the dynamic sensor, which may include using computer filters to isolate the frequency detection of the dynamic sensors, or using high speed cameras in combination with the dynamic sensors to cross-sort based upon shape and frequency detections, as well as other processes.

Materials identified by the dynamic sensor in may be separated from the waste stream using an air sorter or other material diverter unit.

This separated waste stream is then further processed at step 330 in an air separator. In this process, materials are introduced into an air separation system, typically from the top, and the drop by gravity through the system. Air is forced upward through the air separation system. Light materials which typically includes non-metallic material, are entrained in the air and are removed out of one part of the system. Materials not entrained in the air are removed out another part of the system. Air separation systems may include multiple stages, or cascades, where material that falls through one stage is introduced into a second stage, and so on.

In one exemplary embodiment, an air separator system is used in a closed system to process the materials identified at step 320. Air is introduced into an air intake. Material to be separated is introduced into the system at the intake feeder, which includes a rotary valve. The air from the air intake moves into and up a plenum where it interacts with the material as it falls down through the plenum under gravity. The air is pushed through the separator by a fan, for example, a 50 horsepower fan.

The movement of air through the material causes lighter material to be entrained in the air flow while the heavier material falls through the plenum. Residence time of the material in the plenum is optimized in a number of ways. This optimization allows for highly efficient separation of the materials—the residence time is such that the material that falls through the plenum under gravity is mixed with the moving air to maximize the amount of light materials that are entrained in the air as it moves up. This process, in turn, maximizes the amount of heavy material, including the desired copper wire, that falls out of the plenum. In other words, this increased residence time allows for a more complete separation of the light and heavy fraction of materials.

At step 340, the heavy fraction from step 330 is collected from the air separator. This material includes concentrated copper wire and other metals. The light fraction from step 330 is returned to step 310 to be reprocessed, as some metallic material may have been entrained in the light fraction. At step 350, the process ends.

Figure 4:
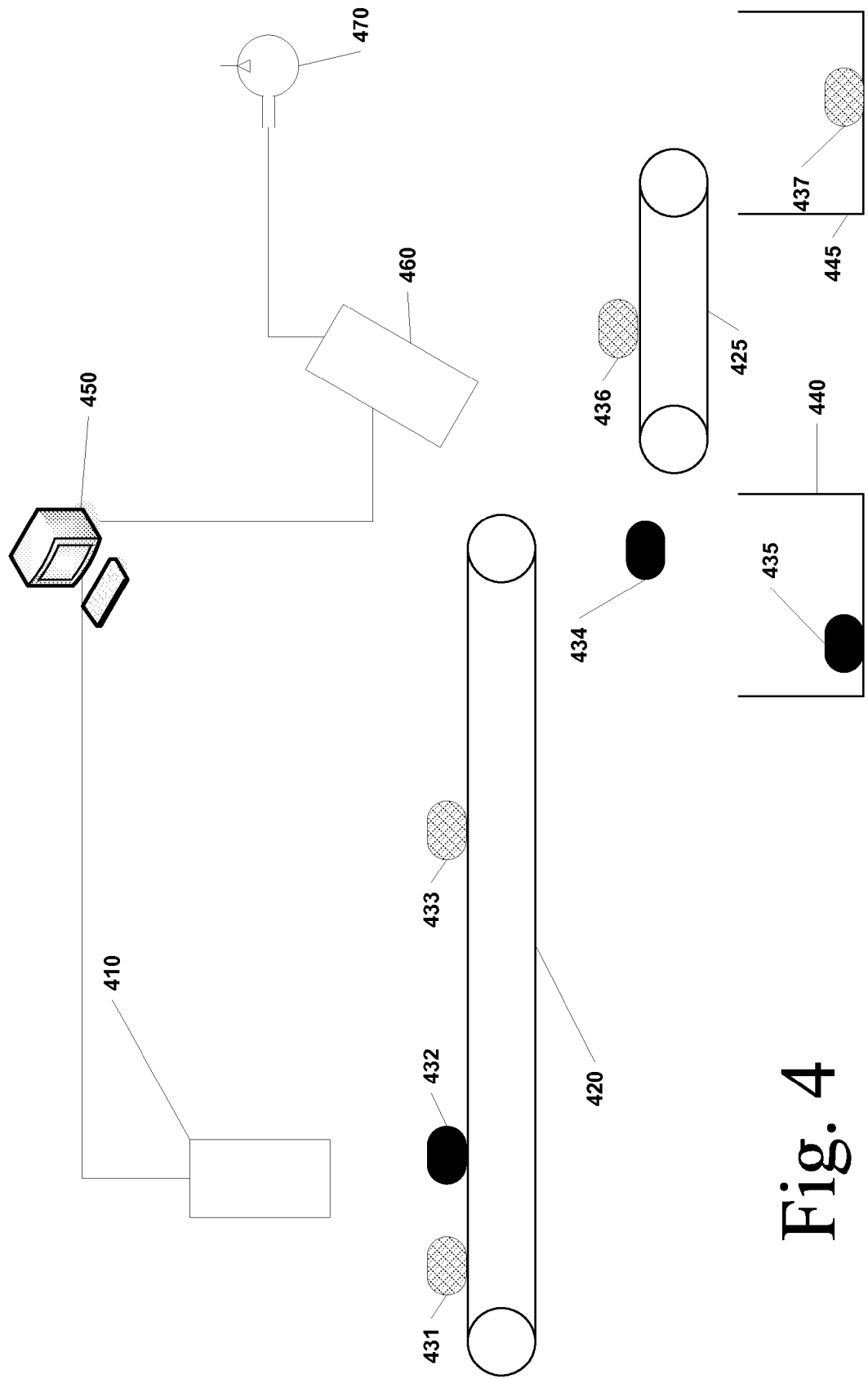
FIG. 4 depicts a dynamic sorting system in accordance with an exemplary embodiment of the present invention.

FIG. 4 depicts a dynamic sorting system 400 in accordance with an exemplary embodiment of the present invention. Referring to FIG. 4, material on a conveyor belt 420 moves under a dynamic sensor array 410. The dynamic sensor array 410 includes multiple dynamic sensors.

The material introduced onto the conveyor belt 420 includes both metallic and non-metallic materials. In FIG. 4, the black objects, such as object 432, are meant to represent metallic objects while the cross-hatched objects, such as object 431, are meant to represent non-metallic objects. The objects, such as non-metallic objects 431, 433 and metallic object 432 move from left to right in FIG. 4 on conveyor belt 420. As the objects move on the belt, they pass under the dynamic sensor array 410. The sensors of the sensor array 410 detect the movement of the metallic objects and the detection signal is sent to a computer 450.

The detector array 410 includes multiple sensors. The array is configured such that more than one detector covers an area on the belt. This overlap of coverage helps to ensure that the metallic objects are detected by at least one of the sensors. The exemplary detector array 410 is depicted as stationed over the material as the material moves on the conveyor belt 420. In an alternative configuration, the detector array 410 may be contained under the top belt of the conveyor belt 420.

The computer 450, which is programmed to receive signals from the detector array 410 indicating the presence of metallic objects, also controls a material diverter unit 460. This exemplary material diverter unit 460 is an air sorter, but other types of material diverter units may be employed. For example, vacuum systems or mechanical arms featuring suction mechanisms, adhesion mechanisms, grasping mechanisms, or sweeping mechanisms could be employed.

The material diverter unit 460 includes multiple air nozzles connected to air valves. The computer sends a signal to the material diverter unit 460 to fire one or more air nozzles to divert a detected object. When a valve is triggered, a compressor 470 supplies air to one or more nozzles. The signal from the computer 450 is timed such that the air jet is delivered as the detected object falls from the conveyor belt 420. The air jet directs the detected object into a container 440, such as is depicted for objects 434, 435. This timing includes the time it takes from triggering the diversion and reaching full air pressure out the nozzles, which is 3 milliseconds in this exemplary system.

The material diverter unit 460 includes air nozzles across the width of the conveyor belt 420, so that it may act on discrete objects on the belt.

In the exemplary system 400, objects that are not acted upon by the material diverter unit 460, that is, objects not detected as metallic objects by the detector array 410, fall onto a second conveyor belt 425. This second conveyor belt 425 carries non-metallic objects, such as objects 436, 437 to a container 445. In this way, the container 440 contains materials concentrated in metallic objects and container 437 has materials depleted of metallic objects. The material in container 437 may be further processed to concentrate and recover plastics, while the material is container 440 may be further processed to concentrate the collected copper or other metal.

Although conveyor belts are described here, alternative conveyance systems could be used. Also, the second conveyor belt 425 could be omitted and the container 445 positioned to receive non-diverted materials.

One of ordinary skill in the art would appreciate that the present invention provides systems and methods for processing metallic materials, such as copper, from waste materials. The systems and methods employ processes that further refine the to concentrate the metallic material after the waste materials are processed with a dynamic sensor.

What is claimed:

1. A system for recovering metal material from a waste material stream comprising the steps of:
    means for processing the waste material stream, where the means for processing measures the rate of change of a current generated as a result of a metallic object moving past the means for processing and generates an indication that the means for processing senses the metallic objects in the waste material stream based on the measured rate of change of the current;
    means for separating, in response to the indication that the means for processing senses the metallic objects in the waste material stream, a metallic fraction of the waste material stream, the metallic fraction comprising the metallic objects identified by the means for processing; and
    an air separator for further separating the metallic fraction of the waste stream to concentrate the metal content of the metallic fraction of the waste stream in a heavy fraction.

* * * * *